United States Patent
Nicolas et al.

(10) Patent No.: US 6,842,537 B2
(45) Date of Patent: Jan. 11, 2005

(54) TEXT DETECTION

(75) Inventors: Marina Marie Pierre Nicolas, Eindhoven (NL); Michel Wouter Nieuwenhuizen, Eindhoven (NL); Jeroen Maria Kettenis, Hamburg (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 619 days.

(21) Appl. No.: 09/817,974

(22) Filed: Mar. 27, 2001

(65) Prior Publication Data

US 2001/0050725 A1 Dec. 13, 2001

(30) Foreign Application Priority Data

Mar. 31, 2000 (EP) .............................. 00201183

(51) Int. Cl.$^7$ ................................ G06K 9/48
(52) U.S. Cl. ...................... 382/199; 382/176
(58) Field of Search ................. 382/176, 199, 382/228, 173; 348/88, 263, 447, 451, 452, 462, 450, 524, 663, 668, 669

(56) References Cited

U.S. PATENT DOCUMENTS

| | | | |
|---|---|---|---|
| 4,868,655 A | 9/1989 | Choquet et al. ............. 358/140 |
| 4,937,667 A | 6/1990 | Choquet et al. ............. 358/140 |
| 5,051,826 A | 9/1991 | Ishii et al. .................. 358/140 |
| 5,353,118 A | * 10/1994 | Cho ........................... 348/451 |
| 5,416,532 A | * 5/1995 | Ko .............................. 348/665 |
| 5,565,998 A | 10/1996 | Coombs et al. ............... 386/46 |
| 5,686,972 A | * 11/1997 | Kim ............................ 348/663 |
| 5,852,678 A | * 12/1998 | Shiau et al. ................. 382/176 |
| 5,936,676 A | * 8/1999 | Ledinh et al. ............... 348/452 |
| 6,185,329 B1 | * 2/2001 | Zhang et al. ................ 382/176 |
| 6,285,801 B1 | * 9/2001 | Mancuso et al. ............ 382/268 |
| 6,298,157 B1 | * 10/2001 | Wilensky ..................... 382/199 |

FOREIGN PATENT DOCUMENTS

| DE | 4440661 A1 | 7/1995 |
|---|---|---|
| EP | 0612187 A2 | 2/1994 |
| EP | 0687105 A2 | 5/1995 |
| EP | 0 720 114 A | * 7/1996 |
| EP | 0 741 487 A | * 11/1996 |

OTHER PUBLICATIONS

Agnihotri L et al, "Text Detection for Video Analysis" Jun. 22, 1999.*

* cited by examiner

Primary Examiner—Bhavesh M. Mehta
Assistant Examiner—Abolfazl Tabatabai
(74) Attorney, Agent, or Firm—Edward W. Goodman

(57) ABSTRACT

In a method of detecting text in a video signal (VS), high horizontal frequencies in the video signal (VS) are detected (ED) to obtain horizontal edge detection results (refo, refpp1, refpp2), and horizontal edge detection results (refo) at a given position are correlated (C) with horizontal edge detection results (refpp1, refpp2) at vertically neighboring positions.

5 Claims, 1 Drawing Sheet

TEXT DETECTION

BACKGROUND OF THE INVENTION

1. Field of the Invention

The invention relates to a method and device for text detection in a video signal.

2. Description of the Related Art

European Patent Application No. EP-A-0,687,105 discloses a method for detecting motion in a video signal. The method can be used for generating new lines between the lines in a field. First, a difference signal across an image is calculated. This difference signal, which gives the minimum motion region of the location examined, is expanded horizontally using edge information calculated from two successive fields. The edge detector is based on a thresholded difference signal between successive odd or even-numbered fields defining the minimum motion region, and on a controlled horizontal expansion of the minimum motion region according to horizontal edges. Herein, a horizontal edge has a high vertical frequency.

U.S. Pat. No. 5,051,826 discloses a vertical edge detection circuit for a television image motion adaptive progressive scanning conversion circuit. The vertical edge detection circuit includes a first (line memory based) circuit for generating an intra-field difference signal from an interlaced scanning input television signal, and a second (field memory based) circuit for generating an inter-field difference signal from the interlaced scanning input television signal. A third circuit selectively outputs a maximum of the intra-field and inter-field difference signals when the inter-frame difference signal is less than a predetermined value, and the intra-field difference signal when it is greater than the predetermined value. What is called a "vertical edge" in this patent, is the same as what is called a "horizontal edge" in EP-A-0,687,105.

U.S. Pat. No. 5,565,998 (Attorneys' docket PHB 33.833) discloses a method of identifying film frames in a video sequence.

Known motion-compensated interpolation techniques appear to suffer from the problem that they are not capable of coping with scrolling text. Especially difficult is video mode text scrolling over a film mode background, which happens when video mode text is added to a film mode signal. Herein, film mode means that a pair of interlaced fields relates to the same motion phase, which occurs when the 50 Hz video signal is derived from a 25 Hz film signal by using 1 film frame to generate 2 interlaced video fields. In video mode, each field represents a separate motion phase. These problems are not dealt with in the above-mentioned publications.

SUMMARY OF THE INVENTION

It is, inter alia, an object of the invention to provide an improved text detection. In a method of detecting text in a video signal according to a first aspect of the invention, high horizontal frequencies in the video signal are detected to obtain horizontal edge detection results, and horizontal edge detection results at a given position are correlated with horizontal edge detection results at vertically neighboring positions.

These and other aspects of the invention will be apparent from and elucidated with reference to the embodiments described hereinafter.

DESCRIPTION OF THE PREFERRED EMBODIMENTS

The purpose of the still/moving text detector according to the invention is to identify, in video pictures, text that is very sensitive to special video processing, like motion-compensated interpolation. By text, we mean a relevant number of consecutive characters, possibly with spaces in-between. The invention is not limited to characters of the latin alphabet; the system also works rather well with other alphabets, in particular with arabic characters.

Figure 1:
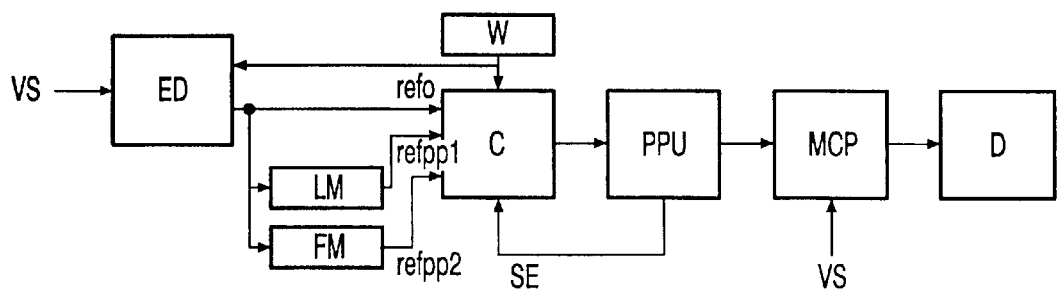
FIG. 1 shows a block diagram of a display apparatus comprising a first embodiment of a moving text detector in accordance with the present invention.

The display apparatus of FIG. 1 comprises:

A transient (edge) detector ED which indicates the horizontal position and direction (low-to-high transition or high-to-low transition) of any text transients in a video signal VS;

A correlator C which compares the position and direction of text transients over 3 spatially consecutive lines (line m in field n, line m-2 in field n (i.e., in an interlaced video signal, the previous line in the same field), and line m-1 spatially between these lines m-2 and m but located in field n-1);

A post-processing unit PPU which checks that the detected transients really correspond to text and, in the case they do, indicates whether the detected text transients correspond to still text or horizontally moving text. The post-processing unit PPU may also give out additional info such as the speed of the text. It can be easily extended to give also the height and length of the text, its position in the screen etc. The post-processing unit PPU sends a speed estimate SE to the correlator C. The speed estimate SE indicates the speed of the text which is used to let the correlator C look at the right place;

A window indication unit W that allows restricting the detection to a specific part of the picture;

A motion-compensated processor MCP (e.g., a 100 Hz converter) that processes the video signal VS in dependence upon the detected text and related information (still/moving text, speed, etc.); and A display device D for displaying the motion-compensated video signal.

The transient detector ED and correlator C work on a pixel basis, whereas the post-processing unit PPU works on a line basis. The transient detector ED looks where the luminance level crosses both a low-threshold and a high threshold within a few pixels (typically 3 pixels). The output refo[pixel] of the detector ED is:

if the pixel corresponds to a high-to-low transient;

if the pixel corresponds to a low-to-high transient; or in other cases.

Basically, the detector ED marks approximately the first and last pixel of text characters.

The principle of the text detection uses the fact that small vertical lines are characteristic of text. In case of text, there is a high correlation between the output of the detector refo[pixel] over a few successive lines (line m in field n, line m-2 in field n, and line m-1 spatially between these lines m-2 and m but located in field n-1); and the density of marked pixels (refo[pixel] at 0 or 2) is relatively high over the whole text length.

The principle of the still/moving detection in interlaced video mode is:

in still text, a frequency of transient matching from line m in field n to line m-2 in field n is lower than a frequency of transient matching from line m in field n to the line m-1 in field n-1 that lies vertically between lines m and m-2 in field n; while in moving text, the frequency of transient matching from line m in field n to line m-2 in field n is much higher than the frequency of transient matching from line m in field n to the line m-1 in field n-1 that lies vertically between lines m and m-2 in field n.

The principle can be easily adapted to progressive video mode by replacing the data from the previous field by the data from the previous frame.

The correlator C and the post-processing unit PPU use these ideas to identify whether a line contains still text, moving text or no text. In one embodiment, three counters are used. Count1 represents the frequency of matching from line m-2 in field n to line m in field n. Count2 represents the frequency of matching from line m in field n to line m-1 in field n-1. Count3 corresponds to the length of the text in the line; it is used to set a suitable threshold for text detection: Still text is detected if Count2>Count3/16 and Count2>Count1. Moving text is detected if Count1>Count3/16 and Count1>2*Count2.

This system has proven suitable for correctly detecting still and moving text. In particular, no practical cases were found where the system identifies moving (or still) text as still (or as moving) text. Within the height of a character sequence, practically all the lines are identified as text lines, apart sometimes from the lines corresponding to the top or bottom of the character sequence.

There are some "false detection" cases with multi-burst signals. This can be solved by checking the presence of a few lines without text between groups of lines with text.

The algorithm can be extended to give out the horizontal speed of the text. Provided we know in which direction the text is moving, the system needs m lines to identify text at a speed equal to m pixels/field. If we do not know the direction, we may need 2*m lines to identify the speed. In most cases, we can detect from which side of the screen the text is coming from and thus know the direction of the text. If we consider that the speed of the text is usually<10 pixels per field, we can provide a reliable speed output within one character height. This speed search mechanism is used for the first field when text is detected. The result of the speed can be used directly for the still/moving text detection in the following fields.

The system can also easily provide information about the size and position of the detected text.

Figure 2:
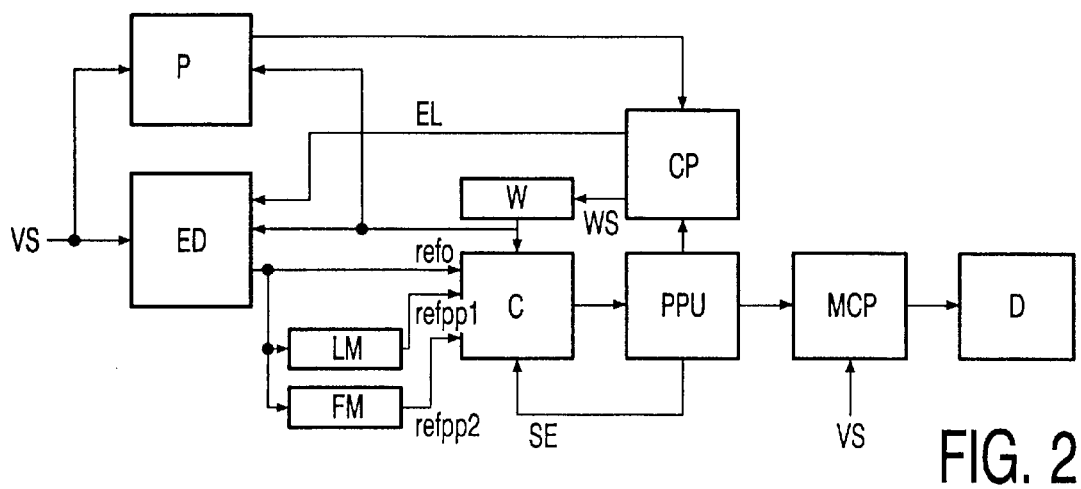
FIG. 2 shows a block diagram of a second embodiment of a moving text detector in accordance with the present invention.

In FIG. 2, a more detailed block diagram of the moving text detector is given. The heart of the system is still made up by the edge detector ED, the correlator C, and the post-processing unit PPU. The output of the edge detector ED provides information of the location and direction of transients. This information is used both by the correlator C and stored in a line memory LM and a field memory FM. The correlator C needs the edge information for three lines: the present line and the previous line from the present field, and the line in between from the previous field. Since most horizontally moving text is expected at the top and bottom of the screen, a flexible window indication unit W is added to limit the amount of processing needed.

In addition to the embodiment of FIG. 1, the FIG. 2 embodiment comprises a pixel-based peak detector P, the output of which is used by a field-based control processor CP to adapt the threshold levels of the edge detector ED by means of an edge level select signal EL. The control processor CP sends a window select signal WS to the window indication unit W for adapting the windows. For example, if moving text is detected, the windows can be adapted to the movement of the text (e.g., instead of two*two horizontally distinct windows, take two*one big windows extending from hwindow_start_left to hwindow_stop_right in the example of FIG. 3). The control processor CP also signals whether the signal is film mode, video mode, or text.

Figure 3:
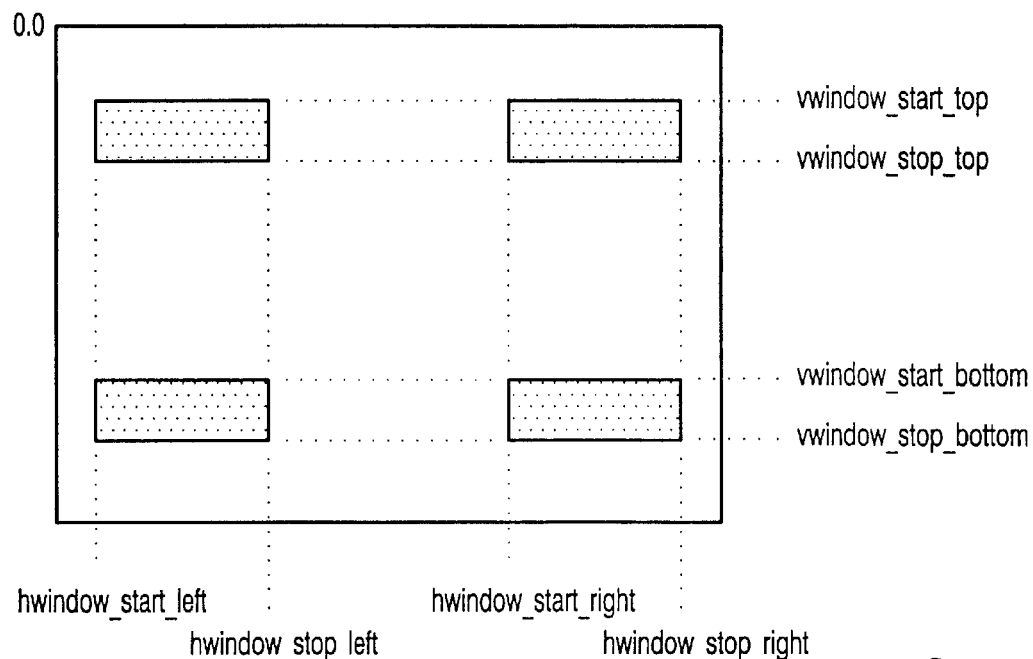
FIG. 3 shows a definition of a measurement window for use in a preferred embodiment of the present invention.

Hence, we define the windows in flexible way (see FIG. 3). Another reason for this flexible windows definition is that text scrolling from right to left or scrolling from left to right (e.g., Arabic) can be detected as early as possible with windows that are as small as possible. By making hwindow_stop_left>hwindow_start_right and vwindow_stop_top>vwindow_start_bottom, the 4 windows can be combined into one.

In a simple implementation, the peak detector P simply detects the highest luminance level in the measurement window.

The text detector detects large, fast transients in the video signal. There are many ways to accomplish this. In one embodiment, an "event detector" is used, which detects when the luminance crosses both of two thresholds (low_threshold, high_threshold again). Only if both thresholds are crossed in succession, the output will go high for a pre-determined time.

A further embodiment comprises a third detector (threshold/speed detector), which not only looks at the crossing of the thresholds, but also sets a limit to the time allowed for a transient. In this manner, both the amplitude and the speed of the transient are taken into account.

The maximum speed of moving text can be quite high. If text crosses the screen in 2 seconds, it means approximately 800 pixels in 100 fields, or 8 pixels per field. With such a speed, the detector might lock onto the wrong transient, indicating the text wrongly as non-moving. For that reason, the detectors are extended to give different outputs for rising and falling transients: 0=falling edge detected, 1=no edge, 2=rising edge detected.

The new detector will be explained below.

The threshold/steepness detector detects when the luminance signal crosses a low threshold or a high threshold. The results are two 1-bit signals. They are stored in a shift register that can contain 3 samples.

In the next step, it is measured if both thresholds are crossed within 3 pixels. This is done by comparing the 1 bit signal from three pixels ago with the present ones. If this is the case:

If the luminance signal goes from high to low (first the high threshold was crossed and, within 3 pixels, the low threshold is crossed as well), the output signal is 0;

If the luminance signal goes from low to high (first the low threshold was crossed and, within 3 pixels, the high threshold is crossed), the output signal is 2; and In all other cases, the output signal is 1.

With respect to storing edge information in memory, it is assumed that the line memory LM can be located in the local cache of the processor CP. The field memory FM must be in external (SD)RAM and, hence, will influence the memory bandwidth. Since the edge detection ED needs only 2 bits per pixel, it is possible to pack the edge detector output of 4 pixels into one byte. In a hardware implementation, the packing/unpacking is very cheap and so, in that case, the gain in memory bandwidth will prevail.

The correlator C operates as follows. The detector ED described above recognizes pixels where there is a high chance that a text character begins or ends (output 0 or 2). The goal of the correlator C is to confirm whether the pixel does corresponds to text or not and, in the case we deal with text, whether it is still or moving. To do this, the correlator C compares the output refo of the detector ED for the current line to the output refpp1of the detector ED 2 lines spatially before in the same field, and to the output refpp2 of the detector ED 1 line before in the field before.

First of all, in lines where text is present, there is usually a relatively high concentration of detector outputs at 0 or 2 over the whole text width. If we assume that text is present, we can consider that in most cases, the limits of the text will correspond to the first and last outputs of the detector different from 1. From the detector outputs, we can thus determine the length of the text. The data is also used to set the threshold for the number of detector outputs at 0 and 2 required for text identification.

We take into account the fact that a majority of text characters tends to contain small vertical lines. Therefore, in the case where text is present, we expect a lot of similarity between the outputs of the detector ED for consecutive lines.

In the case where the text is still, the output refo of he detector ED for the current line is likely to match better the output refpp2 of the detector ED one line before in the previous field, than the output refpp1 of the detector ED 2 lines spatially before in the same field. In an interlaced video signal, refpp1 relates to the previous line in the same field with regard to refo.

On the contrary, if the text is moving, the output refo of the detector ED for the current line is likely to match better the output refpp1of the detector ED spatially 2 lines before in the same field than the output refpp2 of the detector ED spatially one line before in the previous field.

Still text is characterized in that the frequency of transient matching from line m-1, field n-1 to line m, field n is comparable to the frequency of transient matching from line m-2, field n to line m, field n. Moving text is characterized in that the frequency of transient matching from line m-1, field n-1 to line m, field n is much lower than the frequency of transient matching form line m-2, field n to line m, field n.

A mechanism can be added to the text detector to find out the speed of the text movement. If we apply the right motion compensation on the output of a detector by shifting the index in the array refpp2[ ] for the computation of how often the output of the detector for the current line matches the one of the detector 1 line before in the previous field, a moving text will be seen as still text by the correlator. The speed of the text corresponds then to the shift in the index of reffp2[ ].

A search mechanism starts looking for still text. If moving text is detected, the speed is increased by one pixel/line. For the following text line, the calculation of how often the output refo of the detector ED for the current line matches the one refpp2 of the detector spatially 1 line before in the previous field, takes into account the motion compensation of one pixel. If the correlator C still indicates "moving text", the speed is further increased by one pixel for the next text line detection. When the right speed is reached, it means that after speed*lines, the correlator indicates "still text". This process allows detecting text and its moving speed within a few lines.

Since the search mechanism starts from the "still text" position (speed=0), it is relevant to know in which direction the text is moving for a proper converging speed search. If we assume that text coming into a picture is detected quickly enough, we know whether the text comes from right or left in the screen, depending on the window where text is first detected. In that case, we also know the direction of the text scrolling. Another possibility would be to compare the information from the first pixel detected as text and the last pixel detected as text over 2 consecutive fields.

One aspect of the invention can be summarized as follows. In video, text, especially horizontally scrolling text, is very sensitive to motion-compensated processing (e.g., 100 Hz conversion). A preferred embodiment of the invention is able to detect text and to determine whether it is still or moving by means of an edge detector ED and a correlator C. Specific implementations can also give additional information, like the speed of the text, its height or length, and its position on the screen. The principle works on both interlaced and progressive signals, provided the data from reffp2 refer to a different time (field/frame) than refo and reffp1. The invention broadly relates to text detection and is not limited to scrolling text detection (although moving text detection is an advantageous embodiment) or to detection of video mode text on a film mode background (although the invention appeared to be particularly useful in that application).

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The word "field" is applicable in both interlaced and progressive video signals. "Vertically neighboring positions" do not need to be in the same field and they do not need to be on a purely vertical line as they can be on a somewhat slanted line or as the horizontal position of the edge detection result from the previous field may differ from the horizontal position of the edge detection results from the present field. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A method of detecting text in a video signal, the method comprising the steps of:

detecting high horizontal frequencies in the video signal to obtain horizontal edge detection results; and correlating horizontal edge detection results at a given position with horizontal edge detection results at vertically neighboring positions.

2. The method as claimed in claim 1, wherein said method further comprises the step of:
 measuring a density of horizontal edge detection results that indicate a transient.

3. The method as claimed in claim 1, wherein said method further comprises the step of:
 comparing an intra-field transient matching frequency to an inter-field transient matching frequency to distinguish between still text and moving text.

4. A device for detecting text in a video signal, the device comprising:
 means for detecting high horizontal frequencies in the video signal to obtain horizontal edge detection results; and
 means for correlating horizontal edge detection results at a given position with horizontal edge detection results at vertically neighboring positions.

5. A display apparatus, comprising:
 a device for detecting text in a video signal as claimed in claim 4;
 a motion-compensated processor for motion-compensated processing the video signal in dependence upon outputs of the text detecting device; and
 a display for displaying outputs of the motion-compensated processor.

\* \* \* \* \*